Aug. 17, 1965  T. E. HUDGEONS, SR., ETAL  3,200,958
PILFER-PROOF ARTICLE DISPLAY RACK AND STAND
Filed Nov. 23, 1964  6 Sheets-Sheet 1
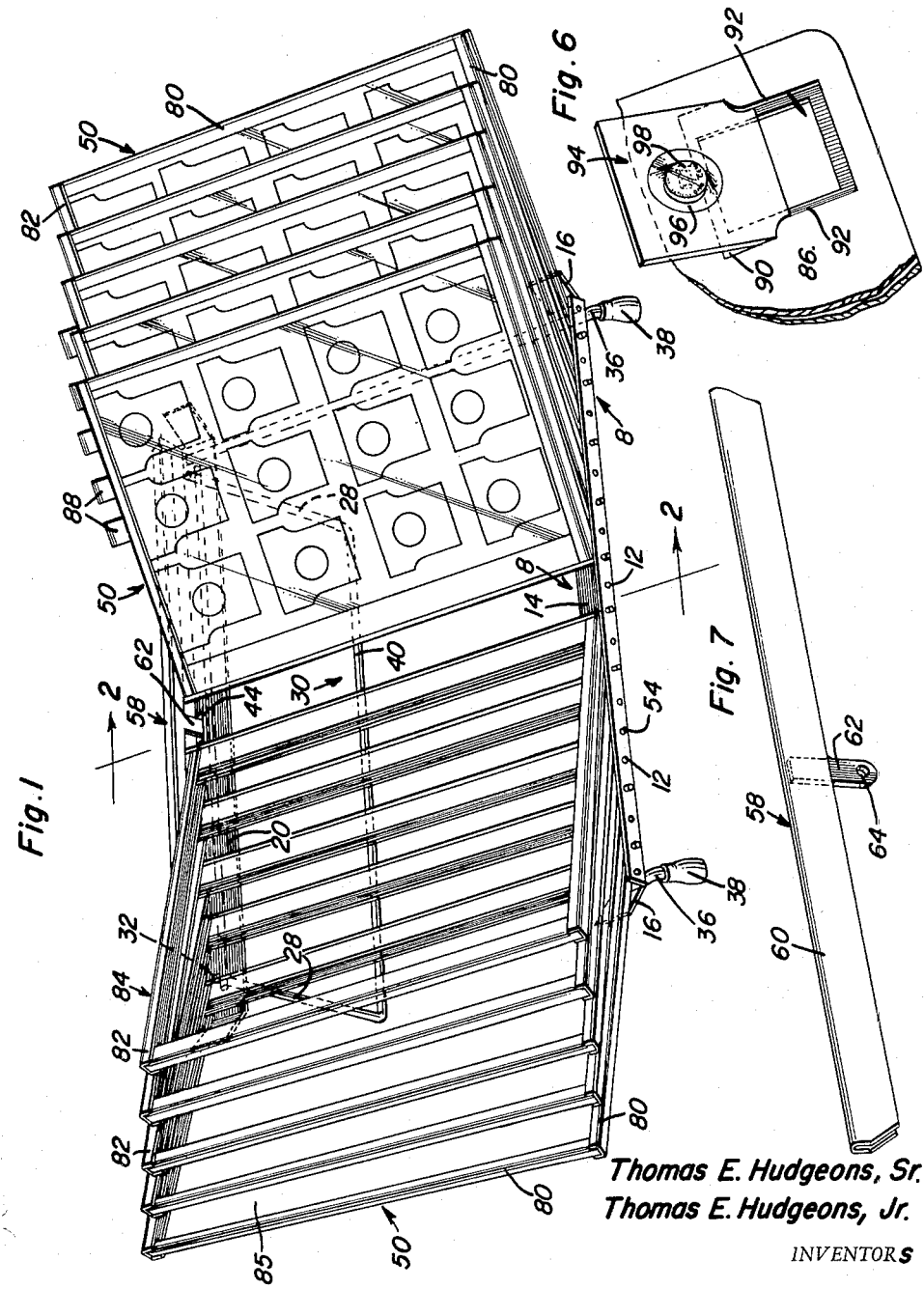
Thomas E. Hudgeons, Sr.
Thomas E. Hudgeons, Jr.
INVENTORS
BY
Attorneys

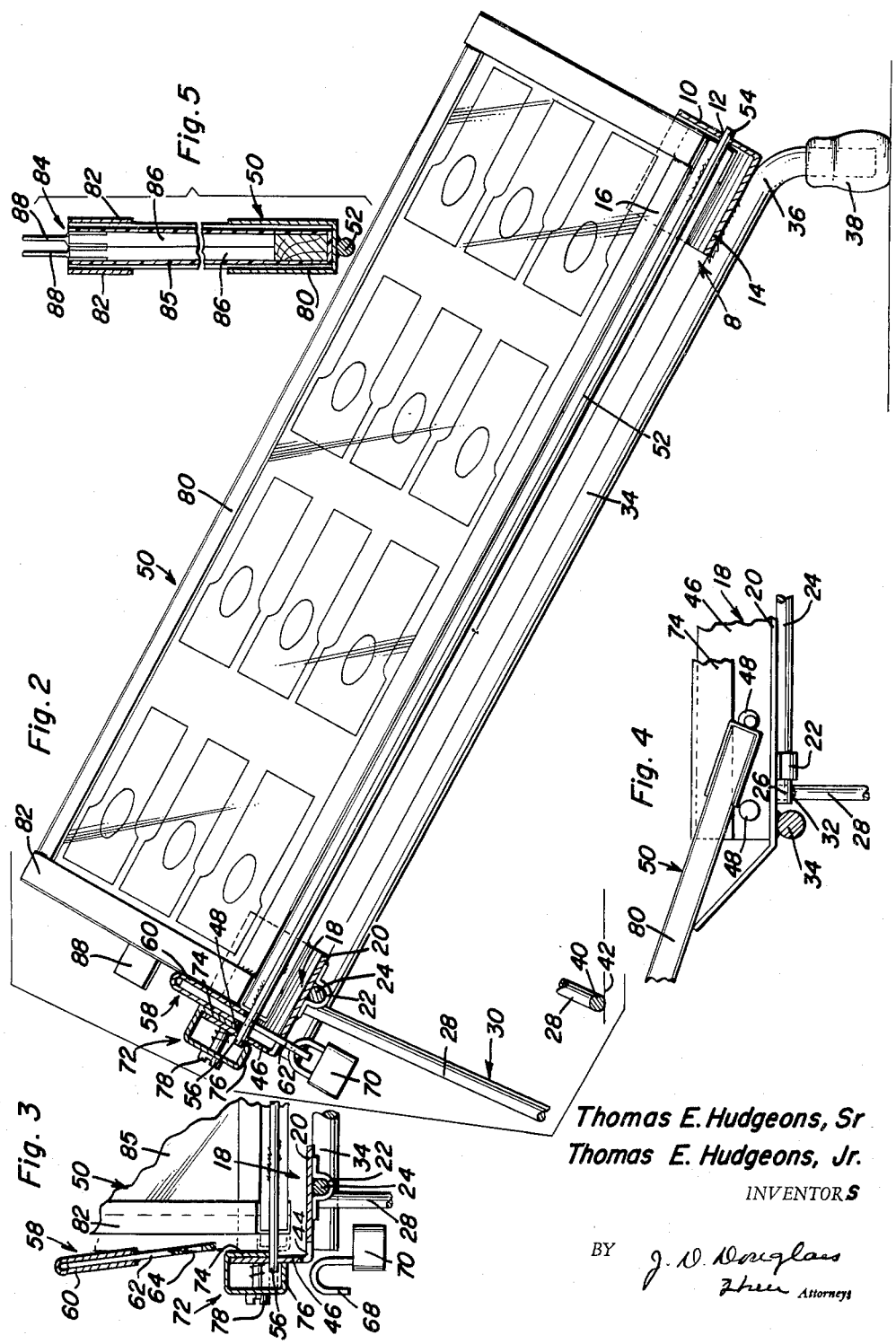

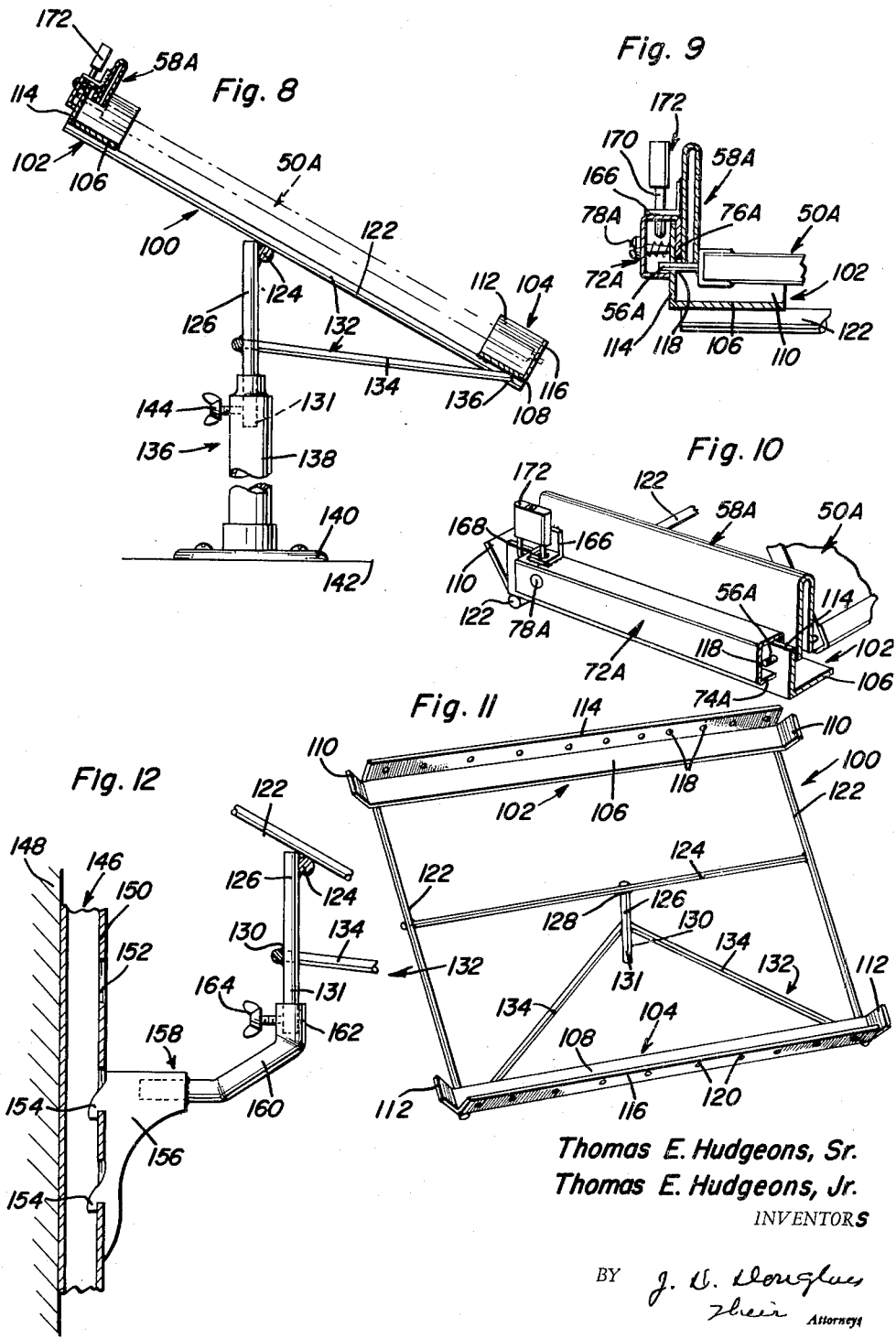

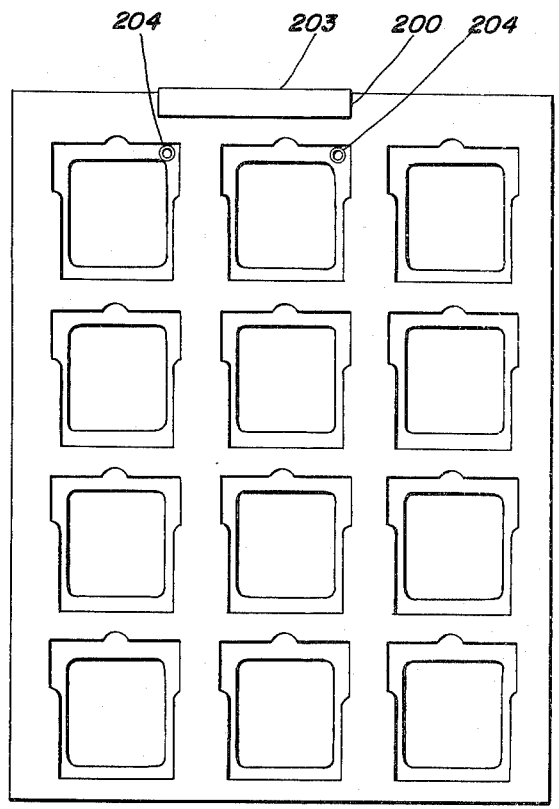
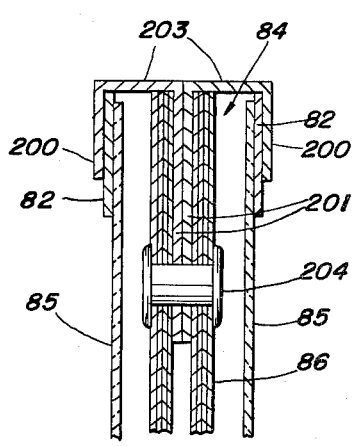
Fig. 16
Fig. 17

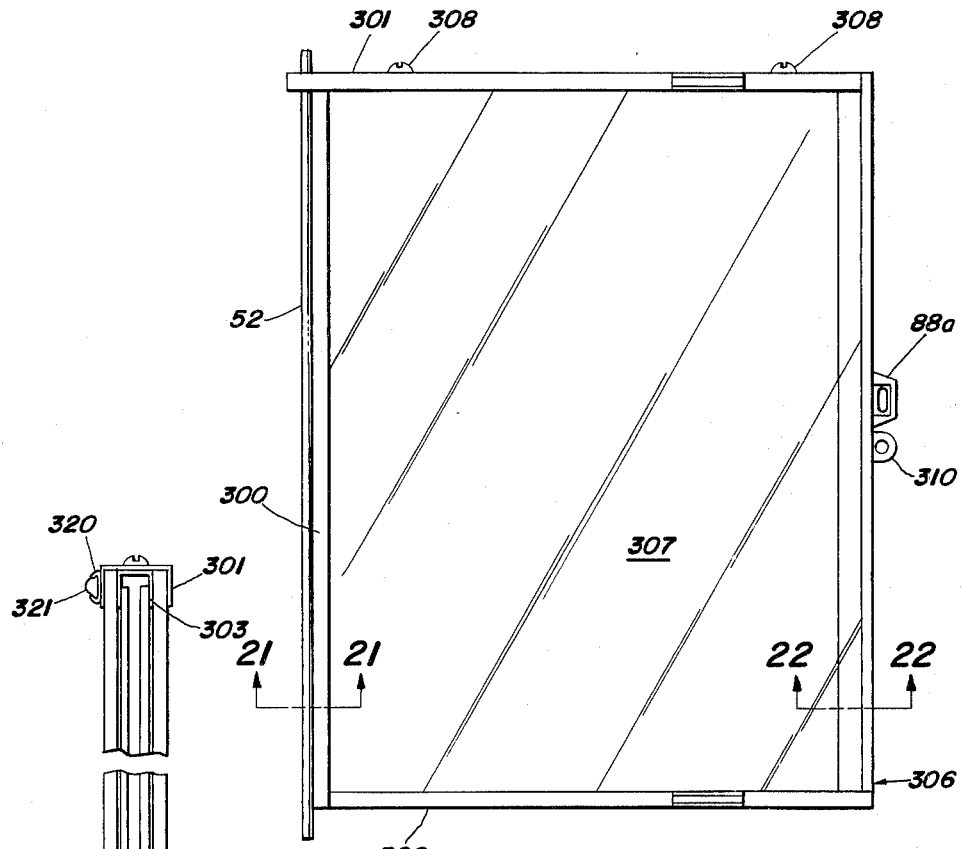

United States Patent Office 3,200,958
Patented Aug. 17, 1965

3,200,958
PILFER-PROOF ARTICLE DISPLAY RACK
AND STAND
Thomas E. Hudgeons, Sr., 12540 Edgewater Drive, Lakewood 7, Ohio, and Thomas E. Hudgeons, Jr., 5751 Parkland Drive, Parma 30, Ohio
Filed Nov. 23, 1964, Ser. No. 412,905
15 Claims. (Cl. 211—4)

This application is a continuation-in-part of our copending application Serial No. 233,305, filed Oct. 26, 1962.

The present invention relates to a pilfer-proof display device for store use which is expressly, but not necessarily, designed and adapted to systematize handling and merchandising small articles of trade such as coins, stamps, medals and the like, and pertains, more particularly, to a floor, wall or counter-type stand or the like supporting a rack having a plurality of panels swingably mounted thereon, each panel embodying a special article presenting and displaying card and lock-controlled safeguarding means therefor.

Briefly summarized, the invention is characterized by two units, namely, a stand and a novel rack having at least one hingedly mounted panel, said panel embodying a receiver-type frame having left and right transparent windows, the upper or top marginal portion of said frame having an opening defining a mouth permitting at least one (sometimes two) display cards to be removably but protectively pocketed therein.

The stand, that is one embodiment thereof, has short front legs and long back or rear legs, said legs serving to support a rack-type frame embodying spaced parallel upper and lower angle irons or equivalent members which are rigidly joined together in coplanar spaced apart relationship whereby to thus provide a suitable frame which functions to support a plurality of attachable, detachable hingedly mounted display panels.

More than one embodiment of the concept will be hereinafter revealed. In carrying out one embodiment of the frame means outstanding opposed flanges of the upper and lower members are provided with rows of spaced openings which constitute bearing holes which are properly paired and aligned to permit trunnions or journals on coacting ends of the display panel (or panels) to be removably but hingedly mounted in said openings.

With further reference to the stand aspect of the concept (FIG. 2) the rearward legs are preferably foldably mounted so that they may be swung to an out-of-the-way position when not being used. In fact, the hinged end portion of the U-shaped member, which embodies said legs, is so constructed that free tip portions at the hinged upper ends of the legs are used as stop abutments and engage a coacting flange of the adjacent angle iron in a simplified but practical manner.

The frame means (both embodiments of the invention) is unique in that one of the component parts thereof functions as a guard. This feature is of box-like form and is mounted on one of the flanges provided therefor and is such in construction that it shields and in fact conceals the long journaling hinge pins at the upper ends of the hinged panels. It is necessary to unfasten and remove the guard before said hinge pins may be either inserted in or removed from the bearing holes with which they cooperate.

In addition, the invention in respect to the pilfer-proof aspect, embodies means to minimize the likelihood of tampering and theft. To this end the upper angle iron of the frame is provided with a simple guard (FIG. 2) having a tongue which projects to the rear and is apertured to accommodate the shackle of a padlock, making it necessary to have the padlock removed by an authorized person before the guard, which is ordinarily in guard position, can be bodily removed.

The invention also features a stand supported frame or rack of the type described above and a plurality of the aforementioned panels, for example, ten swingably mounted panels each with a frame construction provided with crystal clear window panes and wherein the panes and frame are such as to provide a receiver, the receiver being open at the top to permit insertion and removal of a display card with coin holders pocketed on opposite sides thereof and wherein the arrangement is such that a coacting portion of the aforementioned guard overlies an end portion of the entrance so that in order to remove a card for whatever purpose needed, it is necessary for the dealer or other authorized person to first remove the aforementioned guard.

A general objective of the invention is to structurally, functionally and in other ways improve upon means to expedite the steps of merchandising display coins on a mass production basis where, for example, ten wing-like panels may be handled like the leaves of a large book and with opposite left and right sides available which will function to display the protected coins.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in perspective of the complete coin display device which, as is obvious, lends itself to practical use atop a merchandising store counter or the like and shows the rack or stand and the hinged panels and manner in which they are constructed and used;

FIGURE 2 is a view on an enlarged scale with parts in section and elevation taken centrally on the section line 2—2 of FIGURE 1 looking in the direction of the indicating arrows;

FIGURE 3 is a fragmentary view with parts in section and elevation and which is related to the end portion of structure shown to the right thereof in FIG. 2 and showing the attachable and detachable guard removed, a padlock having been detached for that purpose;

FIGURE 4 is a similar fragmentary sectional and elevational view which details a rocker shaft or rod which is hinged to one of the angle irons in a manner to facilitate attachment of the legs of the U-frame (the rear leg means);

FIGURE 5 is a fragmentary sectional view of one of the receiver-like panels;

FIGURE 6 is a fragmentary view in perspective showing a portion of one of the display cards provided with a recessed pocket and also illustrating a coin holder partly inserted into the pocket;

FIGURE 7 is a view in perspective of the bodily attachable and detachable guard;

FIGURE 8 is a view in section and elevation illustrating a modified stand supporting a modified frame or rack wherein one of the display panels is illustrated in phantom lines;

FIGURE 9 is a fragmentary view with parts in section and elevation and which shows a modified chock-like filler member and padlock which is employed to safely hold the same in place;

FIGURE 10 is also a fragmentary view in section and elevation and shown in perspective in a manner to more clearly show the details illustrated in FIGURE 9;

FIGURE 11 is a view in perspective of the rack-type frame structure or frame means with the panels and other component parts omitted and minus the relatively stationary supporting means;

FIGURE 12 is a further modification where the stand of FIGURE 8 has a wall bracket substituted;

FIGURE 16 is an elevational view of one of the display card assemblies removed from the hinged receiver panel;

FIGURE 17 is an enlarged section taken from the line 17—17 of FIGURE 15;

FIGURE 18 is an elevational view of a modified form of hinged receiver panel;

FIGURE 19 is an edge elevational view of the panel of FIGURE 18;

Figure 13:
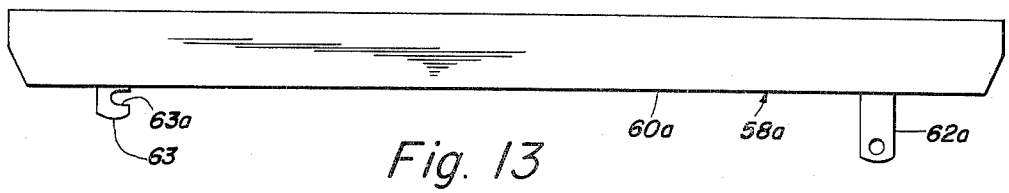
FIGURE 13 is a plan view of a modified form of guard.

FIGURE 20 is an enlarged elevational view of a receiver panel bumper and separator; and FIGURES 21 and 22 are enlarged sections on the lines 21—21 and 22—22 of FIGURE 18.

The construction and style of the base means will vary depending on whether the device is supported for use from the floor, counter, wall or other equivalent support surface. A suitably made caption plate (descriptive of the articles on display) may be provided at the top of the structure.

While the over-all device is ideally designed and adapted for unique presentation of the several items above set forth, it is within the purview of the concept to employ it in other fields of endeavor such as for advertising and displaying camera components, radio parts, transistors and so on. However, and for simplicity of description, the disclosure herein presented pertains to systematized and expedient display and mass merchandising of coins and medals. Accordingly, the invention is to be construed with the foregoing explanation in mind.

Referring now to the views of the drawings in detail and taking up first the portable easel-like stand, it will be evident from FIG. 1 that the stand, looking down on the same, comprises a substantially rectangular frame or frame structure. More particularly and with reference to FIG. 2, the forward lower end portion of the stand at the right is characterized by a lower horizontally disposed panel hinging and assembling member which may be comprised of an elongated angle iron having an upstanding flange 10 provided at its central lengthwise or median portion with a row of longitudinally spaced holes 12 which provide bearings. The other flange 14 is imperforate and is provided at its respective end portions with outwardly flaring or divergent rigid extensions 16 (see FIG. 1) which constitute terminal rests. FIG. 1 clearly shows the bearing holes 12 and the rests 16 at the respective ends. The complemental or companion upper panel hinging member which may also be an angle iron 18, is about the same length and cross section as the one already designated at 8. One flange is denoted at 20 and this flange is provided on its underneath side at longitudinally spaced points with fixed bearing clips 22 which serve to mount a rocker shaft or rod 24. The respective end portions of this rod project beyond the respective clips as at 26 (FIG. 4) and the terminal end portions of the legs 28 of the U-shaped leg member 30 are welded thereto as at 32. Then, too, the end portions of the legs extend at right angles to the axis of the shaft 24 and serve as stops or abutments which abut the flange 20 and limit the swinging of the U-frame 30 from right to left in FIG. 2. It follows that the frame can fold from left to right and when it is swung from the right to left it assumes the upstanding position illustrated. The flange 20 is joined to the flange coplanar companion 14 by connecting rods or frame members 34. The lower or forward end of each rod 34 is laterally bent as at 36 to provide a foot, said foot having a rubber or equivalent protector 38 thereon. Thus the protectors 38 rest on the sales counter (not shown) and the bight portion 40 of the aforementioned U-frame 30 rests on the surface as designated at 42 in FIG. 2. The flange 20 is also provided with a keeper slot 44 (FIG. 3) which serves in a manner to be hereinafter described. The other flange 46 is provided centrally in a lengthwise direction with longitudinally spaced holes 48 which constitute bearing holes which are properly aligned with the aforementioned bearing holes 12. It will assist at this point to mention that the plurality of hingedly or swingably mounted panels 50 are supported between the upper and lower support members 8 and 18. Each panel is provided along one marginal edge with a lengthwise fixedly mounted rod 52 with its end portions projecting beyond the end members of the frame part of the panel. For example, the lower end portions 54 (FIG. 2) constitute short trunnions or journals and are turnable in the bearing holes 12. Instead of a rod 52 for the complete length, short pieces could be welded to the upper and lower ends of the panels. The relatively longer extensions or journals 56 are inserted into and turnable in the bearing holes 48. It should be further noted in FIG. 2 that the length of the frame part of each panel is slightly less than the distance between the upstanding flanges 10 and 46 so that the panel normally has its upper portion spaced below or away from the flange 46 and the extended journal spans this gap or space. Consequently, one can insert each panel by inserting the longer trunnions 56 into the holes 48 and then dropping the pintles 54 down into their holes 12. This can be accomplished when the bodily insertable and removable space filler and locking device 58, FIG. 7, is out of the way. The device 58 may be a simple plate of metal which is folded upon itself to provide a sheath 60 which is of a length and cross-section to fit into the space between the upper edge portions of the panels and the flange 46. It is provided centrally with a tongue or lug 62 having a hole 64 therein to accommodate the shackle 68 on the padlock 70. FIGURE 2 shows how the padlock is located to obtain the locking action in this arrangement. FIGURE 3 shows the padlock removed and also shows the tongue or lug 62 withdrawn from the slot 44 whereupon there is then sufficient space to slide any one of the panels 50 in a manner for inserting and removing them.

It is desired to render the device further tamper-proof and to avoid theft by shielding and rendering inaccessible and concealing the hinge pintles 56. This is accomplished through the use of a protector shield which is denoted generally at 72 and which is of hollow elongated box-like form and has flanges 74 and 76 (FIGS. 2 and 3) for slidingly mounting the box on the flange 46. This shield or box is held in place by screws 78 fitting into screw-threaded holes provided therefor in the flange 46. By removing the screws and slipping the box off, the flange 46 is cleared for assembling the hinge pintles.

All of the panels 50 are the same in construction and a description of one will suffice for all. Each panel has interconnected channel-shaped frame members 80 (FIG. 5). The vertical channels are connected together at upper ends by spaced parallel straps 82 which define an open-mouth 84 for the insertable and removable display cards 86 which are provided with finger tabs 88 permitting the cards to be dropped into the pocket-like receivers thus provided by the framed windows 85. Each display card is provided with a plurality of selectively usable pockets 90 of the shape shown in FIG. 6. The pockets therefore include restricted marginal flap portions 92 and these pockets thus delineated serve to facilitate insertion and removal of any one of the coin holders 94. These coin holders are generally rectangular and each has a transparent means 96 at the center for sealing the coin 98 in place so that it can be clearly seen and inspected, a desirable feature for coin collectors and those who are conversant with practices and procedures of numismatists.

With reference now to FIGS. 8 to 12, inclusive, and particularly to FIG. 11, the numeral 100 designated a one-piece frame structure (alternatively frame means) which is basically similar to the frame structure already described and brought out particularly in FIG. 2. It will be evident that the frame structure or rack is again characterized by upper and lower spaced parallel coplanar primary frame members, more specifically, angle irons 102 and 104, the coplanar flanges 106 and 108 being provided at respective left and right ends with oblique angled extensions constituting rests or stops 110 and 112, respectively. The upwardly projecting top and bottom flanges 114 and 116 are provided with pintle holes or bearings 118 and 120, respectively. These two angle irons 102 and 104 are joined in frame forming relation by coplanar spaced parallel tie or connecting rods 122 having their respective upper and lower ends welded to the coacting flanges 106 and 108 in the manner illustrated. There is a centralized cross-brace 124 which connects the rods 122 and which is provided with a depending oblique angled frame mounting and supporting member which may be conveniently designated as a perpendicular leg 126. This has its upper end welded at 128 to the median portion of the brace rod 124. A median portion is welded at 130 to the apex portion of a substantially V-shaped brace 132, the diverging component parts 134 of which have their lower ends joined as at 136 (FIG. 8) to the underneath side of the bottom flange 108. The brace means 124, 132 and post-like connector or leg 126 provides satisfactory means whereby this rack or frame structure may be mounted on one or another supporting stand. For example, the stand in FIG. 8 is denoted at 136 and comprises a tubular upright or standard 138 joined to an appropriate base 140 secured to a stationary support (table, counter, floor, or the like) 142. The upper portion of the standard provides a socket for reception of the lower end 131 of the leg 126, and is securely held in place by a setscrew 144.

It may be desirable to employ the support means of FIG. 12 instead of that in FIG. 8 and this is accomplished in the manner illustrated. With reference to FIG. 12, the numeral 146 designates a wall bracket, that is mounted on the wall 148 and has a tubular portion, the front wall 150 of which is provided with vertical keeper slots 152 for reception of the keeper hooks 154 on the attachable and detachable plate portion 156 of the bracket 158. This bracket has a suitably angled portion 160 with a socket 162 having a setscrew 164 to accommodate the insertable and removable end portion 131 of the leg 126.

The upper angle iron 102 corresponds in construction and function with the aforementioned angle iron 18 and serves to support the slidably mounted applicable and removable protector shield 72a which is removably held on the flange 114 by way of flanges 74A and 76A (see FIGS. 9 and 10). Screws or equivalent fasteners 78A serve as positive retaining elements. With this shield or guard 72A in place, it will be evident that it covers the bearing holes 118 in which the insertable and removable journals or pintles 56A are mounted. FIG. 9 shows a construction which corresponds much to that shown in FIG. 2 except that in FIG. 9 the modified chock-like insertable and removable space filler 58A is provided with right angles clips 166, one of which has a hole 168 therein which lines up with a suitable hole in the wall of the shield 72A in a manner to accommodate the shackle 170 of the padlock 172.

The elongated sheath-like space filler or chock 58A functions here the same as in the already described arrangement and as brought out in FIGS. 9 and 10 in that it is located when in use between the top flange 114 and an upper edge of the hingedly mounted swingable display panel 50A.

Figure 14:
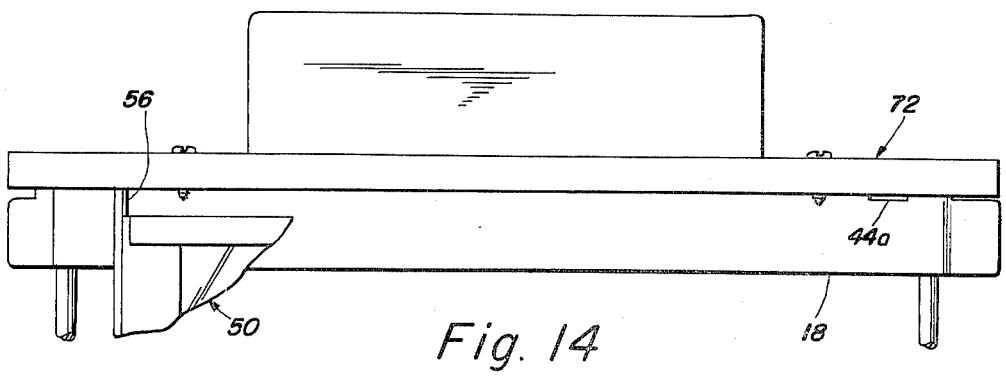
FIGURE 14 is a fragmentary elevational view of the top of the support frame, with the guard removed and showing in fragment one of the hinged receiver panels in place.

Referring to FIGS. 13 and 14, there is illustrated (FIG. 14) the top portion of a frame, such as shown in FIGS. 1 and 2, which includes the upper support member 18 and the trunnion enclosure 72. In the interest of clarity, only a fragment of the display panel 50 is shown, with the trunnion 56 in place. The chock-like space filler 58a is similar in construction to that described and includes the body 60a having a tongue 62a disposed near one end. Near the other end is a similar but shorter tongue 63 having a notch 63a. This filler is held in place by hooking the tongue 63 around the trunnion 56 and then swinging into position between the shield 72 and the tops of the panels 50 until the tongue 62a projects through a slot 44a in the flange of the upper member 18 near the end of the frame. The tongue 62a thus extends beyond the flange and may be padlocked in place the same as that of FIGS. 1 and 2. It has the advantage that, when placed on a counter, the padlock is easily accessible from the front, at one side, and the salesman does not have to walk in back of the stand to unlock the same.

Figure 15:
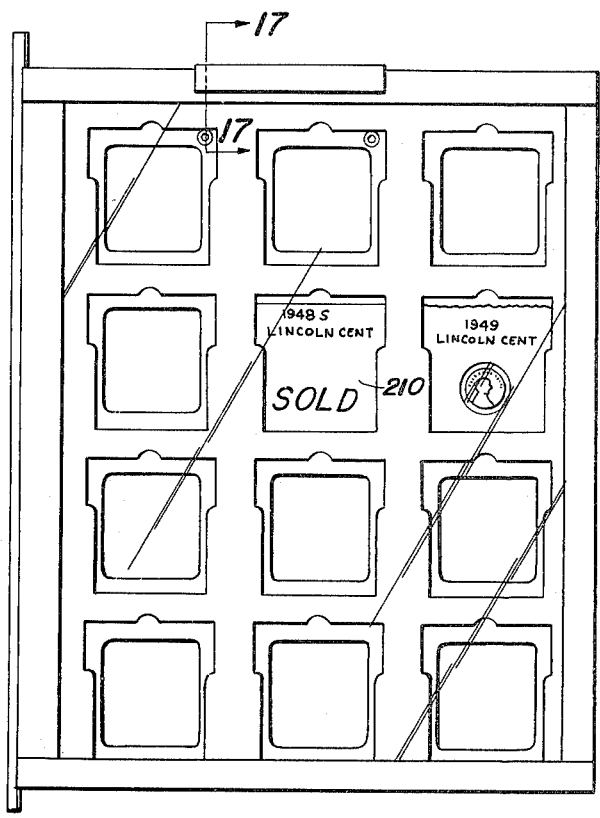
FIGURE 15 is an elevational view of a modified form of one of the hinged receiver panels.

As was previously mentioned, two of the display cards could be used, facing in opposite directions and thus enable coins to be displayed from both sides of the leaf-like members. In FIGS. 15 to 17 inclusive, there has been illustrated a display card assembly where two display cards are secured together, back to back to back, and both removable together as a unit.

The display cards per se are constructed the same as described. They are, however, removable two at a time as a unit. To this end there is provided a pair of upper channel members each of which is comprised of a downwardly extending outer short flange 200 joined in spaced relation to an inner longer flange 201 by a bridging part 203. The inner flanges 201 have the display sheets 86 riveted thereto by rivets 204. Thus the rivets hold the channel members and the display sheets together to provide a unit so assembled the outer flanges 200 are spaced apart from each other and from the display sheets. When the unit is inserted into the upper opening 84 in the panels 50 when the windows 85 are lowered into the frame, the outer flanges telescope over the outside of the upper straps 82, FIG. 17. When it is desired to remove the display panel, the channel member 200 provide a convenient means for gripping the panels for removal.

As shown in FIG. 15, the pockets may have a card 210, indicating the particular article that is supposed to be in that particular pocket and, when that article is removed, the card shows that the article has been sold and what the article was that was sold. This allows the merchant to re-order and replenish the particular articles sold.

In some instances, particularly on very large displays where it is not convenient to remove the display panels from the leaf-like holders, the panels are arranged to be removed from the side. The support frame can be the same as that described but the display leaves are modified as shown in FIGS. 18 to 20 inclusive.

The frame has the usual trunnion rod 52 welded to an outer back channel member 300. Inside the back channel member is an inner channel track member 305 (FIG. 21). An outer bottom channel member 302 together with an inner track channel member 304, is joined to the back channel member at its lower end. At the top there is an outer removable top channel member 301 which is secured to an inner track channel 303 by screws.

The inner track channel member 303 is welded to the back inner channel member 305. The open side is formed by a pair of reversely bent straps 306, the bending of which is provided an inner flange 306a and a shorter outer flange 306b, the bridging part being curved. The spaces between the inner and outer channel members are arranged to receive the protective glass or plastic 307, which may be slid into place by removing the top member 301, after which it is held by the screws 308 which extend through the outer top channel member 301 and are threaded into the inner channel member 303. At this time the outer edges of the glass are disposed between the flanges 306a and 306b of the outer channel members. Thus the display sheets, which may be of the same character as those described in conjunction with FIGS. 1 and 2 may be slid into position through the side opening in the outer channel members and are guided into position and framed by the inner channel members. The sheets have the usual tabs, such as 83a for removing them. When the sheet or sheets are in place, a padlock may be inserted through openings in lugs 310 which are welded to the inner flanges 306a of the outer channel members 306, and project outwardly beyond the edges thereof, thus preventing removal thereof.

Guard bumpers are provided for the frames and include a short C-shaped channel 320 welded to the frame, such as 301 or 302 and which receives and holds a block of resilient material 321 which may be of semi-cylindrical cross section. These may be placed on opposite sides of the frame to thus hold them apart when they are swung from one side to the other as the leaves of a book.

It is apparent that the invention provides a display mechanism wherein a plurality of devices are clearly visible to the customer and where he can, at a glance, make a selection of the article which he desires. Of importance is the fact that although the articles are quickly and easily removed, they can only be removed by authorized persons.

Although the invention has been described in conjunction with certain specific embodiments thereof, it will be apparent that numerous and extensive departures may be made therefrom without departing from the spirit or scope of the invention as defined in the appended claims.

We claim:

1. A device of the class described comprising a composite panel construction embodying a frame having interconnected compartment parts joined together and each one channel-shaped in cross-section with the channels communicating and providing a receiver, the latter being open at one end and permitting a card to be fittingly inserted into the reception channels, a card having selectively usable pockets on front and back sides, individual coin holders fitted into said pockets, said cards with the pocketed holders being fitted in said channels but withdrawable therefrom through an open end provided for the withdrawal step, base supported means for display counter use, said means having frame members provided with bearing holes, said panel having attaching and hinging journals which are removably journalled in their respective bearing holes, and a guard removably mounted between said panel and the frame members and locking means locking the guard to the frame members.

2. A stand for use on a coin examining and merchandising counter or equivalent stationary support comprising a pair of spaced parallel inclined rod members provided at forward ends with downturned legs terminating in feet, a pair of coplanar similar angle irons disposed in spaced apart parallel relation, each iron having corresponding flanges thereof spanning the space between and attached to the rods and thus joining the two rods and two angle irons to provide a framework, the other flanges of said angle irons being provided with rows of longitudinally spaced holes and said holes constituting bearings, a rod member mounted in bearing clips on one of the flanges of one of the angle irons, and a U-shaped leg member having a bight portion and arm portions, said arm portions having free ends fixed on the respective end portions of said rod member in a manner to be swung toward and from the coacting flange when moving the U-member into and out of position.

3. The structure defined in claim 2, and in combination at least one display panel embodying a frame, said frame having a rod member mounted on one longitudinal component thereof with end portions of the rod members constituting mounting and turning journals, said journals being adapted to be removably and hingedly mounted in selected pairs of the bearing holes.

4. The structure defined in claim 2, and in combination, at least one display panel embodying a frame, said frame having a rod member mounted on one longitudinal component thereof with end portions of the rod members constituting mounting and turning journals, said journals being adapted to be removably and hingedly mounted in selected pairs of the bearing holes, the length of said frame member being slightly less than the distance between corresponding parallel flanges of the respective angle irons to permit relative sliding movement of the journals relative to the bearing holes in which they are mounted for rotation, and an insertable and removable chock-like space filler and safety locking means interposed between one transverse end of said panel and a cooperating lengthwise surface of a coacting flange.

5. A coin examining and merchandising device comprising: a pair of spaced parallel inclined rod members having forward ends provided with downturned legs terminating in feet, a pair of coplanar angle irons disposed in spaced apart parallel relation, each angle iron having like flanges thereof attached to and spanning the space between said rod members and joining the latter and the angle irons and providing a rack-like framework, the other like parallel flanges of said angle irons being provided with rows of longitudinally spaced holes constituting bearings, an adapter rod mounted for rotation in bearing clips provided therefor on one of the flanges of one of the angle irons, a U-shaped leg member having a bight portion and arm portions, said arm portions having free ends fixed on the respective end portions of said adapter rod in a manner to be swung toward and from said one flange when moving said U-shaped leg member into and out of position, at least one display panel embodying a frame, said frame having an attaching and hinging rod mounted on one longitudinal component thereof with end portions of said rod constituting mounting and turning journals, said journals being removably and hingedly mounted in an oriented pair of the bearing holes, the length of said frame being slightly less than the distance between said other parallel flanges to permit sliding movement of the journals relative to the bearing holes in which they are mounted, and an insertable and removable pilfer-proofing space filler and locking means interposed between one transverse end of said frame and a cooperating lengthwise surface of the coacting flange, said means having a lug adapted to extend through and beyond a keeper slot provided therefor in said last-named flange and a second locking means engaging the lug.

6. The structure defined in claim 5, and wherein said frame embodies interconnected channel-shaped frame members which conjointly provide an open-ended pocket-like receiver, and a display and merchandising card fitted removably into said receiver, said display card having a plurality of selectively usable pockets and said pockets being constructed for retention of attachable and detachable coin holders.

7. A coin examining and merchandising device comprising: a rack-like frame embodying a pair of spaced parallel coplanar rod members having forward ends provided with downturned legs, upper and lower angle irons disposed in spaced apart parallel relation, each angle iron having a bottom flange, said bottom flange spanning the space between and being attached to the respective rod members and thus assembling and joining said rod members and angle irons, the upstanding top flanges of said angle irons being provided with longitudinally spaced bearing holes, said bearing holes being cooperatively aligned, a hinging rod mounted for rotation underneath the bottom flange of the upper angle iron, a folding U-shaped leg member having a bight portion and arm portions, said arm portions having free ends fixed on the respective end portions of said hinging rod, at least one display panel embodying a frame having a hinging and an attaching rod member fixed on one longitudinal component of said frame, the end portions of said attaching rod member constituting mounting and turning journals, said journals being removably and hingedly mounted in a selected pair of the aforementioned holes, the length of said frame being less than the distance between said top flanges to permit relative sliding movement of the journals relative to said selected pair of holes, and an insertable and removable space filler and frame locking device interposed between one transverse end of said frame and a cooperating lengthwise surface of the coacting top flange, said device having a lug adapted to extend through and beyond a keeper slot provided therefor in said last-named flange, and locking means engaging said lug.

8. The structure defined in claim 7 and wherein said display panel frame embodies interconnected channel-shaped frame members whose channel portions open toward and communicate with each other and cooperatively provide an open-ended pocket-like display and merchandising card receiver, and a display and merchandising card fitted removably into said receiver, said card having a plurality of selectively usable pockets, and readily attachable and detachable coin holders fitted removably in said pockets.

9. The structure according to claim 8, and wherein said display panel frame is provided with transparent viewing and protecting windows covering the respective viewable surfaces of said card and coin holders and rendering said coin holders inaccessible until said card is intentionally withdrawn by way of the open end of said receiver, and said locking device rendering said card pilfer-proof in that a portion of said device projects across and closes an end portion of said open end and accordingly blocks unauthorized removal of the card by way of said open end.

10. An examining and merchandising device for small articles such as coins, medallions and the like comprising; a composite panel embodying a frame made up of interconnected frame members; namely, a horizontal bottom frame member and vertical side frame members each channel-shaped in cross-section with their respective channels communicating and providing a receiver, the upper ends of said side frame members being connected together by spaced parallel straps and thus defining a receiver, said receiver being open at the upper end only and being provided with front and back transparent windows, a card having selectively usable pockets on front and back sides, readily insertible and removable coin holders fitted into the respective pockets, said card and pocketed coin holders being fitted in said receiver with the marginal edges of the card seated and confined in said channels, the upper end of said card being withdrawable through said open end, and a portable rack comprising upper and lower spaced parallel angle irons and frame members, said frame members being disposed in coplanar spaced-apart parallelism and said angle irons having bottom flanges fixed on cooperating end portions of said frame members and also having upstanding flanges, the upstanding flange of the lower angle iron having at least one bearing hole therein, the corresponding upstanding flange of the upper angle iron having an aligned cooperable bearing hole therein, the first mentioned frame being provided at lower and upper ends thereof with a journal which is rotatably and slidably mounted in the bearing holes provided in the upstanding flanges of the angle irons, the upper open end of said frame being spaced from and parallel to said last-mentioned upstanding flange, said space adapted to accommodate pilfer-proofing means comprising a readily insertible and removable chock, said chock being rigid and fitted in said space and preventing said frame from being bodily moved in a direction toward the adjacent upstanding flange, and locking means securing the chock in the cooperating upper angle iron.

11. The structure defined in claim 10 and in combination a hollow box-like guard removably mounted on the last-named upstanding flange, said guard enclosing and shielding the adjacent bearing hole and the journal therein and being provided with an aperture, said chock being provided with a clip and said clip being apertured with the aperture oriented with the aperture in said guard and said apertures being aligned to accommodate the locking means.

12. The structure defined in claim 10 and wherein said insertable and removable chock has a portion thereof extending over and covering a substantial portion of the open end of said frame in a manner to prevent unauthorized removal of the card by way of said open end, that is, during the time that the chock is in its card-covering pilfer-proofing position.

13. A pilfer-proof display device for the display of articles of merchandise comprising a main frame, a base for supporting the frame and rectangular article enclosing members hingedly supported by the frame, said frame including spaced apart bearing means for said article enclosing members, said article enclosing members each including a sub-frame and projecting portions thereon pivotally engaged with the bearing means and extending beyond the ends of the frame, said sub-frames each being enclosed on three sides and open on the fourth side, the open side being disposed in spaced relation to one of the main frame members, display sheets removably disposed in the sub-frame and removable from the open side, and a removable means disposed between the main frame member and the sub-frame in overlapping engagement with the open side of the sub-frame for locking the article displaying sheets within the sub-frame.

14. A device as described in claim 13, wherein said removable means is provided with means cooperating with the main frame to lock said member to the main frame.

15. A device as described in claim 14, wherein said cooperating means includes a tongue on one member extending through the other member and said tongue is formed with an opening and a lock is disposed in the opening.

References Cited by the Examiner

UNITED STATES PATENTS

| | | | |
|---|---|---|---|
| 1,060,443 | 4/13 | Feldman | 40—102 |
| 1,251,254 | 12/17 | Lough | 211—169 |
| 1,436,544 | 11/22 | Starr | 40—152.1 |
| 1,564,359 | 12/25 | Klein | 108—6 |
| 1,711,585 | 5/29 | Brunhoff | 248—166 X |
| 2,571,073 | 10/51 | Stroop | 206—83 |
| 2,617,219 | 11/52 | Conley | 40—102 |
| 2,953,251 | 9/60 | Stone | 211—4 |
| 2,959,877 | 11/60 | Deinlein | 40—102 |

CLAUDE A. LE ROY, *Primary Examiner.*